US006463528B1

(12) United States Patent
Rajakarunanayake et al.

(10) Patent No.: US 6,463,528 B1
(45) Date of Patent: Oct. 8, 2002

(54) METHOD AND APPARATUS FOR SIMPLIFYING THE CONFIGURATION OF SEVERAL MODELS OF CUSTOMER PREMISE EQUIPMENT

(75) Inventors: Yasantha Nirmal Rajakarunanayake, San Ramon; Thomas Edward Lilley, Sunnyvale, both of CA (US)

(73) Assignee: Covad Communications Group, Inc., Santa Clara, CA (US)

( * ) Notice: Subject to any disclaimer, the term of this patent is extended or adjusted under 35 U.S.C. 154(b) by 0 days.

(21) Appl. No.: 09/294,595

(22) Filed: Apr. 20, 1999

(51) Int. Cl.[7] .............................................. G06F 15/177
(52) U.S. Cl. ........................ 713/1; 713/100; 709/221; 370/351; 714/38
(58) Field of Search ..................... 713/1, 100; 370/13, 370/351, 352, 241, 337, 463, 377; 709/220, 221; 710/8, 104; 714/3, 8, 36, 38

(56) References Cited

U.S. PATENT DOCUMENTS

| 5,343,461 A | * | 8/1994 | Barton et al. ................. 370/13 |
| 5,355,320 A | * | 10/1994 | Erjavic et al. ............... 364/488 |
| 5,661,668 A | * | 8/1997 | Yemini et al. ............... 364/550 |
| 5,661,725 A | * | 8/1997 | Buck et al. .................. 370/377 |
| 5,790,523 A | * | 8/1998 | Ritchie, Jr. et al. ......... 370/241 |
| 5,915,008 A | * | 6/1999 | Dulman ...................... 379/201 |
| 6,081,517 A | * | 6/2000 | Liu et al. .................... 370/352 |
| 6,157,634 A | * | 12/2000 | Mehta et al. ............... 370/351 |
| 6,198,750 B1 | * | 3/2001 | Buchhloz et al. ........... 370/463 |

* cited by examiner

Primary Examiner—Jeffrey Gaffin
Assistant Examiner—Rijue Mai
(74) Attorney, Agent, or Firm—Jung-hua Kuo

(57) ABSTRACT

A method and apparatus which simplifies the configuration of CPEs of several models, potentially from several manufacturers. Each model may be employ a different syntax for the configuration commands. A portable system is implemented to issue commands with all such different syntaxes. The configuration parameters are retrieved from a central system and the commands are issued to each CPE to be configured. The issued commands have the syntax corresponding to the model of the configured CPE, and in some cases incorporate the retrieved parameters. The invention is particularly useful for service providers who may have the responsibility of configuring numerous CPEs of several different models.

21 Claims, 7 Drawing Sheets

| CPEID | Current StateID | StateDescription | Success StateID | Failed StateID | RoutineID |
|---|---|---|---|---|---|
| 4 | 0 | Check FlowPoint 3.0 Software | 24 | 23 | 135 |
| 4 | 1 | Try Default Password | 4 | 2 | 103 |
| 4 | 2 | Try IWO Password | 5 | 3 | 104 |
| 4 | 3 | Try Special User Password | 6 | 14 | 106 |
| 4 | 4 | Configure IWO Password | 5 | 21 | 105 |
| 4 | 5 | Begin Configuration | 7 | 13 | 107 |
| 4 | 6 | Configure IWO Password | 5 | 21 | 105 |
| 4 | 7 | Rebooting CPE | 29 | 29 | 108 |
| 4 | 8 | After Reboot, Look for Login: | 26 | 25 | 130 |
| 4 | 9 | Run Diagnostics | 11 | 12 | 109 |
| 4 | 10 | Diagnostics Passed | 11 | 11 | 99 |
| 4 | 11 | Finished | 0 | 0 | 0 |
| 4 | 12 | Repeat Diagnostics? | 9 | 11 | 110 |
| 4 | 13 | Admin Mode, Configuration | 0 | 21 | 0 |
| 4 | 14 | Password Unknown | 0 | 0 | 0 |
| 4 | 15 | Detect Flowpoint Hardware | 17 | 18 | 101 |
| 4 | 16 | Error: Communication Port | 0 | 0 | 0 |
| 4 | 17 | Detect Flowpoint Software | 19 | 20 | 102 |
| 4 | 18 | Error: Detect HW Version | 0 | 0 | 0 |
| 4 | 19 | Logout | 1 | 21 | 100 |
| 4 | 20 | Logout | 1 | 21 | 100 |
| 4 | 21 | Error: Unexpected Response | 0 | 0 | 0 |
| 4 | 22 | Error: IWO Password Failed | 0 | 0 | 0 |
| 4 | 23 | Detect CPE | 15 | 40 | 99 |
| 4 | 24 | Try Default Password | 32 | 27 | 131 |
| 4 | 25 | After Reboot, Trying IWO | 9 | 22 | 104 |
| 4 | 26 | Try IWO Password | 9 | 21 | 132 |
| 4 | 27 | Login Prompt | 28 | 21 | 130 |
| 4 | 28 | Try IWO Password | 32 | 31 | 132 |
| 4 | 29 | Login Prompt | 30 | 25 | 130 |
| 4 | 30 | Try IWO Password | 9 | 21 | 132 |
| 4 | 31 | Login Prompt | 32 | 14 | 133 |
| 4 | 32 | Detect Flowpoint Hardware | 33 | 18 | 101 |
| 4 | 33 | Detect Flowpoint Software | 4 | 4 | 102 |
| 4 | 40 | Try Again | 15 | 16 | 95 |

Figure 5

| | |
|---|---|
| 610 | \<cpecommand\> |
| 611 | \<wait\>5\</wait\> |
| 613 | \<say\>eth list |
| 615 | \</say\> |
| 617 | \<parameters\>lanip\</parameters\> |
| 619 | \<expect\>\<lanip\>\</lanip\>\</expect\> |
| 621 | \<success\>lan ip address confirmed: \<lanip\>\</lanip\>\</success\> |
| 625 | \<failure\>Lan IP Address Mismatch: \<lanip\>\</lanip\>\</failure\> |
| 628 | \</cpecommand\> |

FIGURE 6A

| | |
|---|---|
| 650 | \<cpecommand\> |
| 651 | \<wait\>5\</wait\> |
| 653 | \<say\>sh int eth0 |
| 655 | \</say\> |
| 659 | \<parameters\>lanip\</parameters\> |
| 661 | \<expect\>\<lanip\>\</lanip\>\</expect\> |
| 664 | \<success\>Lan IP Address Confirmed: \<lanip\>\</lanip\>\</success\> |
| 665 | \<failure\>Lan IP Address Mismatch: \<lanip\>\</lanip\>\</failure\> |
| 668 | \</cpecommand\> |

FIGURE 6B

METHOD AND APPARATUS FOR SIMPLIFYING THE CONFIGURATION OF SEVERAL MODELS OF CUSTOMER PREMISE EQUIPMENT

BACKGROUND OF THE INVENTION

1. Field of the Invention

The present invention relates to customer premise equipment (CPE) such as internet protocol routers and bridges, and more specifically to a method and apparatus for simplifying the configuration of several models of CPEs.

2. Related Art

Customer premise equipment (CPE) is often used by users to connect to external systems. A CPE generally refers to a communication device residing in a user's premises and provides communication by interfacing with a compatible device usually part of a larger network. Internet protocol (IP) routers, bridges, frame relay or Asynchronous Transfer Mode (ATM) switches, gateways are examples of CPEs.

A CPE often requires extensive configuration before being able to communicate with networks. In the case of routers, it may be necessary to configure network addresses, routing protocols, and other information. Many times, lower level (in models such as OSI and TCP/IP) protocol information such as whether ATM or Frame Relay is the available transport and the corresponding channel numbers may also need to be configured to enable an IP router to communicate with a network.

Configuration typically entails a human being issuing (usually by typing on a key-board) commands to a CPE. Each command generally has a specific syntax and one or more optional parameters. In a typical key-board based interface for configuration, the syntax generally contains alpha-numeric text in a pre-specified format. Due to the numerous commands that need to be issued to a CPE to specify all the configuration information, the configuration task is often complex even for technically adept people to configure CPEs.

The complexity of configuration poses special challenges for service providers who may take at least some responsibility for the configuration of CPEs. For example, service providers such as ILECs (incumbent local exchange carriers) and CLECs (competitive local exchange carriers) which provide high bandwidth connections over telephone lines, and providers of high bandwidth over cable (e.g., AtHome Networks) may often be required to provide installation services for CPEs at Small Office Home Office (SOHO) type environments. Installation generally includes physical tasks such as connecting the right cables, placing the CPE and cables in a desired place, and also configuration of the CPE.

The complexity of configuration is compounded as users often prefer to employ different models of CPEs available from different vendors. Each model may employ a different (and custom) syntax structure for specifying the same configuration information. As an illustration, an IP router available from Cisco Systems (www.cisco.com) may require commands of "interface eth0" and "IP address 194.193.192.191 255.255.255.0" to set the IP address of lan0 interface to 194.193.192.191 (configuration parameter), while a router from Flow Point Corporation (www.flowpoint.com) may require a command of "eth IP address 194.193.192.191 255.255.255.0" for the same purpose. Due to the numerous models an installer may have to deal with, the configuration task is often complicated.

At least to save costs, a service provider may wish to employ people not having extensive knowledge of the configuration of CPEs for the installation task. Unfortunately, the complexity of configuration of CPEs potentially from different vendors may make the task impractical or ineffective. In addition, the service provider may wish to increase the productivity of the installers by simplifying the tasks which need to be performed by them.

At least for the above reasons, what is needed is a simplified method and apparatus which enables even relatively non-skilled people to conveniently configure CPEs. In addition, the method and apparatus may need to operate in conjunction with different models of CPEs employing different types of configuration interfaces.

SUMMARY OF THE INVENTION

The present invention simplifies the configuration of CPEs. Several models of CPEs, with each model employing a different syntax for configuration commands may be easily configured. The invention is particularly useful for service providers who may have the responsibility of configuring numerous CPEs of several different models.

In accordance with the present invention, a portable system is implemented to be able to issue configuration commands with the syntax specified for each of the models of CPE. A portable system is a data processing system which is particularly suitable for transportation from one geographical area to another. A lap-top computer or notebook computer is an example of a portable system.

A customer of the service provider may place an order to configure a CPE. Typically, the customer is an organization having an interest in providing high speed connections from user locations to a remote location of the organization. The service provider and the customer together specify the configuration parameters for completing the order. At least some of the configuration parameters are used as parameters with the configuration commands during installation.

An installer may load the configuration parameters to a portable system from the central system. The installer may then provide a physical interface between a CPE to be configured and the portable system. The installer may specify when to begin the issuance of the configuration commands. In response, the portable device may issue the configuration commands to configure the CPE.

The portable device issues the commands consistent with the syntax corresponding to the model of the CPE being configured. Typically, the CPE model is specified in the data loaded from the central system.

In an embodiment, a serial interface is implemented between the portable system and the CPE, and the commands are issued in the form of ASCII text as would be entered from a key-board in typical configurations without the operation of the present invention. Accordingly, the present invention may be compatible with most CPE models which allow for configuration using key-boards.

Thus, the present invention enables multiple models of CPEs to be configured as a portable device can be implemented to issue commands to configure these models of CPEs.

The present invention enables a portable device to successfully configure several models of CPEs as the portable device is implemented to issue configuration commands with the syntax corresponding to these models of CPEs.

The present invention is particularly useful for service providers responsible for installation of numerous CPEs as the service providers may employ relatively low-skilled installers for configuring the CPEs.

The present invention enables relative low-skilled installers to configure a CPE as the installer is shielded from the details of command syntax and parameters while configuring the CPE.

The present invention enables configuration of most CPE models as most CPEs provide for a serial interface on which ASCII commands can be sent and such ASCII commands can be sent on the serial interface using a portable device in accordance with the present invention.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIG. 5 is a table illustrating a state machine implemented as a state table for issuing commands for the configuration of CPEs of different models in accordance with the present invention; and FIGS. 6A and 6B are diagrams illustrating how different routines of a state table can be implemented in an embodiment.

DETAILED DESCRIPTION OF THE PREFERRED EMBODIMENTS

1. Overview and Discussion of the Present Invention

The present invention provides simplified configuration of CPEs enabling even relatively low-skilled people to configure different models of CPEs available from several vendors. The invention is particularly useful for service providers who may have the responsibility of installing many CPEs.

In a typical situation, a portable system (such as notebook or lap-top computer) is implemented to generate commands with the syntax required for each CPE model. In addition, the portable system may be used to receive (or otherwise load) command parameters required for the configuration of a CPE, and issue commands to the CPE by combining the command syntax and the parameters. Thus, the portable system may be made to issue commands without an installer having much knowledge of the syntax and other technical information.

As a result, a CPE may be configured reliably without requiring broad knowledge of various models of CPEs from an installer. Substantial effort may be required in ensuring that the portable system can issue the appropriate commands to different CPEs. However, the overhead of such an effort may be justified as a service provider may need to configure several models of CPEs with different user interfaces.

The present invention is described below in further detail with reference to several examples. An example environment in which the present invention can be implemented is described first.

2. Example Environment

Figure 1:
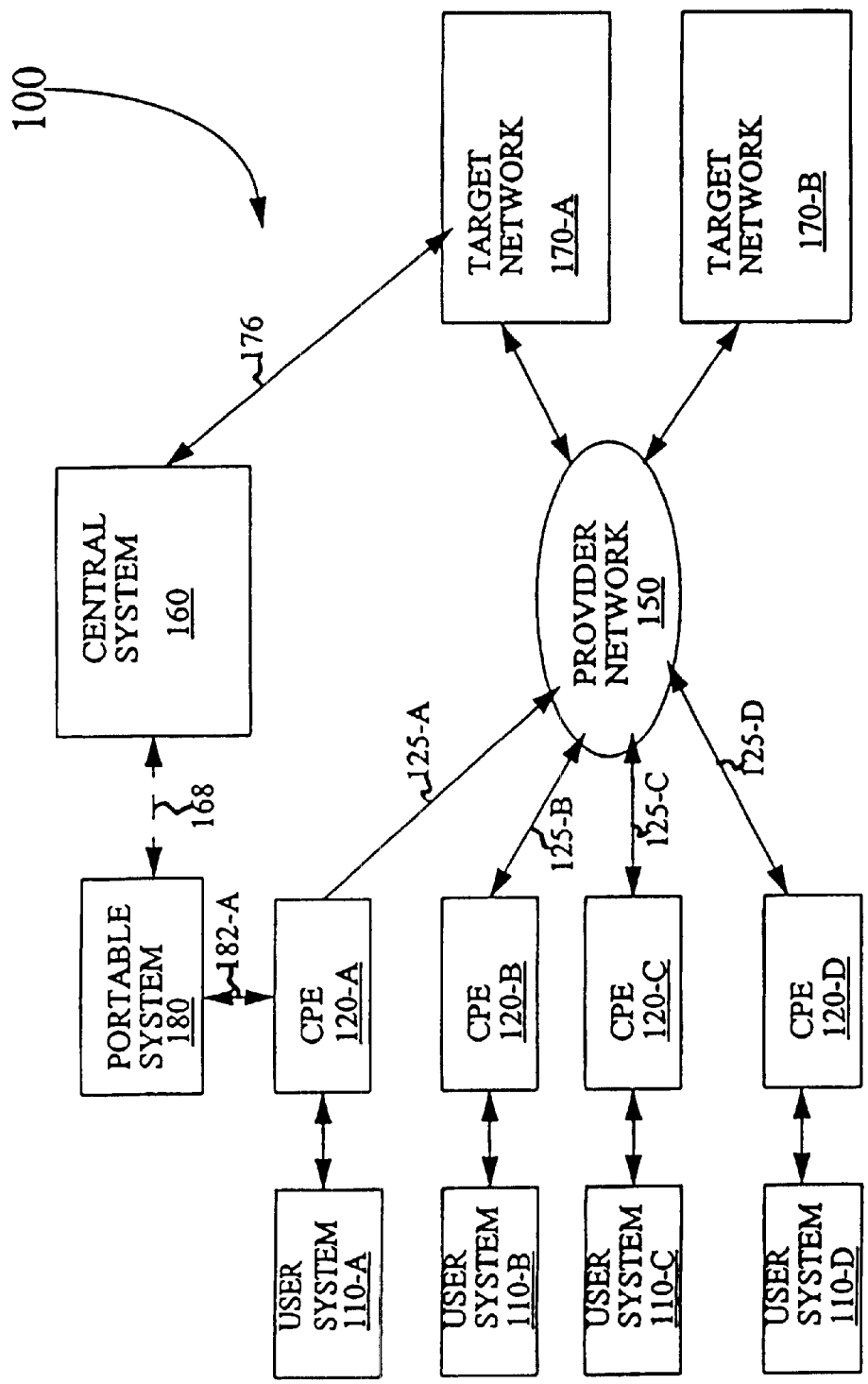
FIG. 1 is a block diagram illustrating an example environment in which the present invention can be implemented.

FIG. 1 is a block diagram of an example telecommunication system 100 in which the present invention can be implemented. Telecommunication system 100 may contain many user systems 110-A through 110-D connected to provider network 150 by CPEs 120-A through 120-D respectively. Each of the four CPEs is connected to provider network 150 by a respective one of the links 125-A through 125-D. In the present application, user systems collectively or individually may be referred to by reference numeral 110 as will be clear from the context. Similar convention is used in the case of other like elements (e.g., CPEs and target networks in FIG. 1).

Each user system 110 is typically used by an end user to communicate with one or more of the target networks 170. In the case of users from dwellings, user system 110-A and CPE 120-A may be located in a welling. A computer system is an example of a user system and an IP router is an example of a CPE.

Each target network 170 may contain many systems (e.g., computer systems, PBX systems) and is typically owned and operated by customers (typically organizations) such as corporations and internet service providers. In the present application, a customer generally refers to a party who contracts with another party (typically a service provider) for the installation or configuration of CPEs. A customer may enter into such a contract when a service provider provides virtual connections on provider network 150 from user locations to the corresponding target network.

For example, target network 170-A may be related to an employer (customer) and user systems 110-A and 110-B may be related to employees of that employer. The employer may wish to provide high bandwidth connections to the employees so that the employees may telecommute, that is, work from home. As another illustration, target network 170-A may be related to an ISP. The ISP may wish to provide high bandwidth remote access connections to end users using user systems 110-C and 110-D.

Each of the links 125 may be implemented using one of many technologies. Some links may be implemented using digital subscriber loop (DSL) technology well known in the relevant arts. Some other links may be implemented on broadcast cable. In general, each of the links 125 can be implemented using any compatible technology between CPE 120 and provider network 150. Similarly, each CPE may be connected to the corresponding user system by any compatible technology. For example, a CPE and the user system may be connected by a local area network.

A service provider may be responsible for installing many CPEs 110. Installation generally includes physical tasks such as placing CPE 120-A in a convenient space, connecting the right wires between CPE 120-A and user system 110-A, and configuring the subject CPE 110-A. A person performing at least some of the installation tasks will be referred to as an installer. Even though only four CPEs are shown in FIG. 1, a real world environment may include several thousands of CPEs for each service provider, and these CPEs may in turn be of several models with different user interfaces for configuration. It is accordingly necessary that the CPEs be configured efficiently without requiring extensive knowledge from the personnel configuring them.

A service provider may use portable system 180 in conjunction with central system 160 to simplify the configuration of the CPEs in accordance with the present invention as described below in further detail with several examples. A method in accordance with the present invention is described first. Several example embodiments implementing the method are then described.

3. Method

Figure 2:
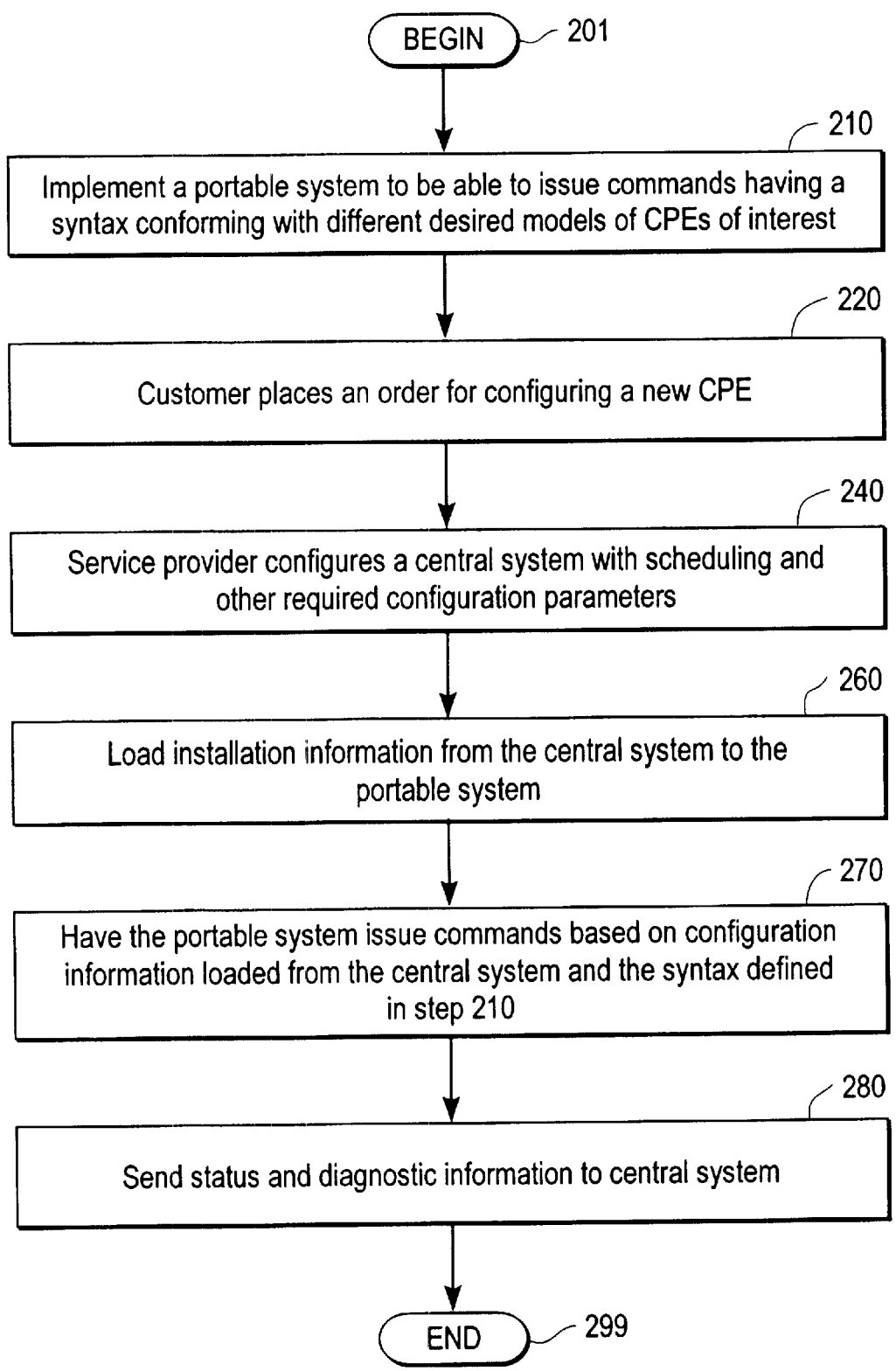
FIG. 2 is a flow-chart illustrating a method according to which a service provider may provide a CPE configuration service in accordance with the present invention.

FIG. 2 is a flow-chart illustrating a method in accordance with the present invention. The method is described with reference to an example scenario in which each target network 170-A relates to a 'customer' of a service provider. The customer may wish to often add several related user systems. For example, an employer may wish to provide access to a newly joined employee so that she may telecommute from home. As another example, an ISP may wish to add a new remote access user.

The service provider may need to configure the CPEs corresponding to all such users. As described below, the flow-chart of FIG. 2 provides an effective and simple method to configure all the CPEs even with different models providing for different configuration interfaces.

In step 210, a designer may implement any necessary hardware, software and/or firmware to enable portable system 180 to issue commands consistent with different CPE models. In an embodiment, a designer may store the necessary routines on central system 160, which can be downloaded to a note book (lap-top) computer system used for portable system 180. However, any other data processing system (e.g., network computers, palm computers) can be used for portable system 180. In general, portable system 180 can be any data processing system which can receive CPE configuration information and issue commands consistent with the specific user interface provided by the subject CPE.

In step 220, the customer places an order to configure a CPE related to a user. Typically, the order is placed to add the user. However, an order may specify modification of a prior configuration also. The order is preferably placed by interfacing directly with central system 160. In an embodiment, the customer may dial into central system 160 using an out-of band connection (e.g., telephone call) shown as line 176. In an alternative embodiment, the customer may access central system 160 over the Internet, which is not part of provider network 150. The information placed for an order may include some information such as user address, contact information, type of wiring present in the user location, service selection information (desired speed), and configuration parameters specific to CPE 110-A. Some of the configuration parameters may be used as command parameters.

The configuration information generally depends on the nature of devices used for CPE 110-A, provider network 150, and target network 170-A to which CPE 110-A needs to communicate. Assuming that CPE 110-A is implemented as an IP router and provider network 150 is implemented as an ATM network, a customer may need to provide a CPE IP address on an interface to link 125-A, the IP address of a router (not shown in FIG. 1) in target network 170-A, the sub-net mask, the routing protocol (RIP, OSPF, etc.) to be used, and the broadcast IP address to be used.

Similarly, on the local side between user system 110-A and CPE 120-A, the customer may need to specify the IP address for CPE 110-A, a subnet mask, and routing protocol. To enable the correct commands to be issued to CPE 110-A, the CPE model information may also be provided.

In step 240, a service provider may configure central system 160 with any other information necessary to process the order. Typically, the service provider may need to specify the person (installer) to whom the installation task should be assigned (to avoid duplication of effort), the date on which the installation maybe performed, channel identifiers consistent with the configuration of provider network 150 (e.g., PVC information in the case of ATM), and any other information that is necessary and convenient to provide the installation service.

In an embodiment, an installer is automatically selected by central system 160. Orders are generally assigned to minimize the distance traveled by the installers. The selection scheme can be implemented in a known way. Even though a single system is shown in FIG. 1, it should be appreciated that multiple central systems may be provided for maintaining portions of the necessary information. For conciseness and ease of understanding, the invention is described with reference to using one central system.

In step 260, an installer (typically an employee or contractor of the service provider) retrieves the installation information (including configuration information) from central system 160 using connection 168. The connection can be out-of-band connection as shown in FIG. 1 or provided within provider network 150. Optionally, only the information about the CPEs that a person needs to configure (install) may be provided to the person's portable system 180. Thus, telecommunication system 100 generally includes several portable systems. The transferred configuration information generally includes all the configuration parameters (relevant to the CPEs to be configured).

In step 270, a person connects portable system 180 (with the downloaded information) using physical interface 182-A, and causes portable system 180 to generate the necessary commands to configure CPE 120-A. As noted above with reference to step 210, a designer may implement the necessary software/hardware or firmware to issue specific commands for different models of CPE. Many or all of the parameters for the commands may be received in step 260. It is generally necessary that the user interface (for the installer) with portable system 180 be simple such that an installer with relatively low technical skills can configure any model of CPE contemplated by the designer noted in step 210.

One of several interfaces may be used for physical interface 182-A as will be apparent to one skilled in the relevant arts. In an embodiment, portable system 180 may generate commands on a network (physical interface 182-A) using protocols such as Simple Network Management Protocol (SNMP) well known in the relevant arts. An alternative embodiment described below uses a serial (e.g., RS-232) interface well known in the relevant arts to generate ASCII commands on physical interface 182-A. Typically, such ASCII commands are issued from key-boards (either from another computer system or directly plugged into CPE 120-A). In general, portable system 180 may be designed with any physical interface 182-A and command structure (SNMP, serial line, etc.) consistent with that supported by CPE 120-A.

By issuing the commands, portable system 180 may configure CPE 120-A consistent with the order placed in step 220 and any additional information provided by a service provider in step 260. As should be appreciated, for the same configuration parameters (e.g., IP address), different commands (i.e., with different syntax) may need to be issued to be able to configure several models of CPE 110-A. An embodiment of portable system 180 which can generate such different commands is described below in further detail.

4. Portable System

Figure 3:
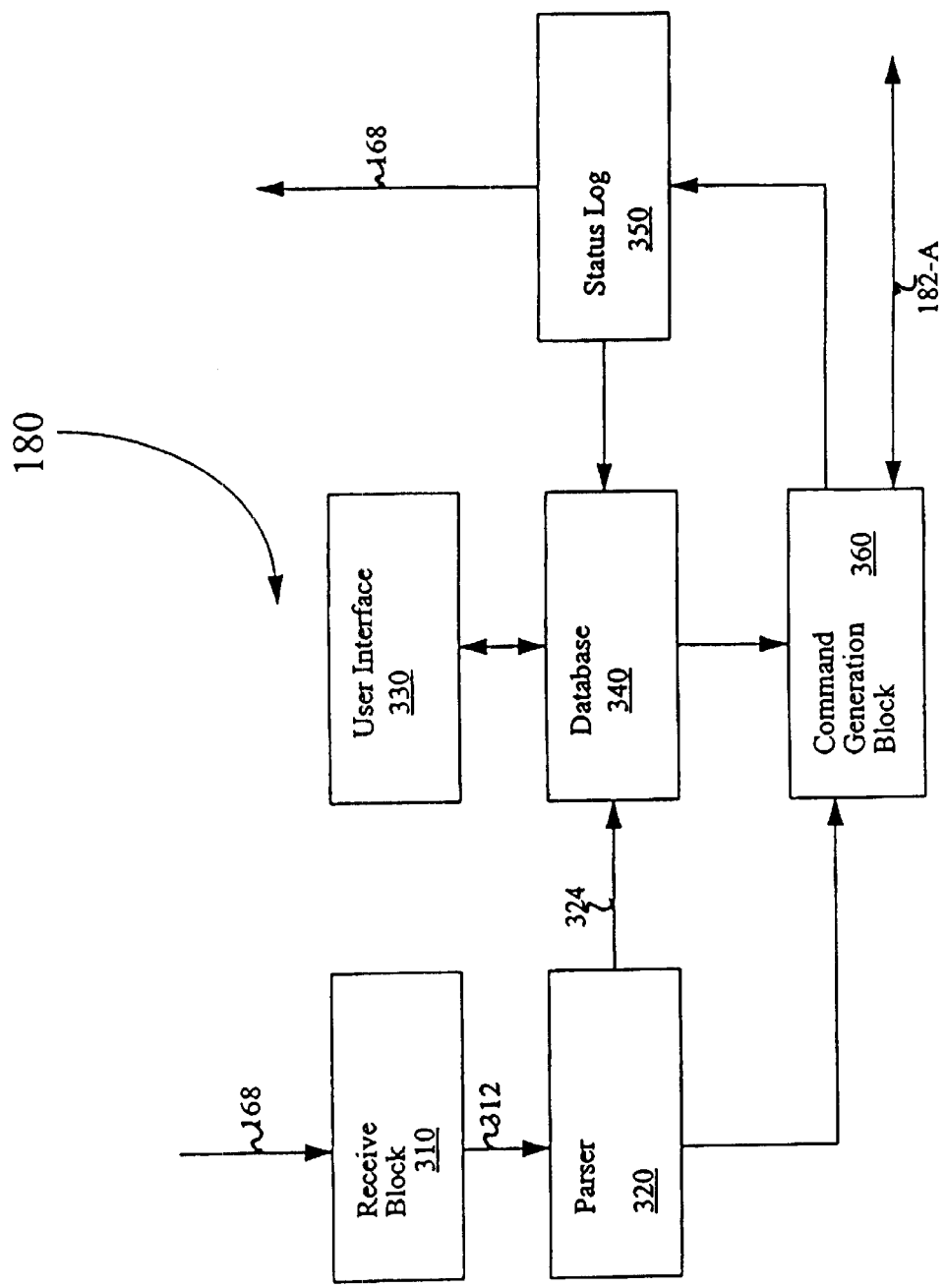
FIG. 3 is a block diagram illustrating an example portable system which may be used to issue commands for different model of CPEs without the installer having to understand the command syntax or command parameters.

FIG. 3 is a block diagram of an embodiment of portable system 180 in accordance with the present invention. Portable system 310 may contain receive block 310, parser 320, user interface 330, database 340, status log 350, and command generation block 360. Each block is described below in further detail.

Receive block 310 receives data from central system according to a pre-designated protocol. The data may relate to installation of CPE 120-A or to modify command generation block 360. In an embodiment, the installation related information (including configuration data) is received using Extensible Meta-Language (XML) well known in the relevant arts. Receive block 310 sends the received data to parser 320 on line 312.

Parser 320 receives data from receive block 310, and parses the data to determine the action to be performed with the received data. If the data relates to configuration, parser 320 stores the data in database 340 using database interface 324. Database 340 is an example of a non-volatile storage. Parser 320 and database 340 may be implemented in a known way. Database 340 can be implemented using one of several databases available in the marketplace.

If the received data relates to configuration of command generation block 360, parser may modify the command generation block 360. Any necessary binary data may be encoded as ASCII text. Parser 320 may decode the binary data and implement the necessary modifications to command generation block 360. The modification may be performed to, for example, add new models of CPEs or to configure CPE 120-A for new services (e.g., virtual private network).

Figure 4A:
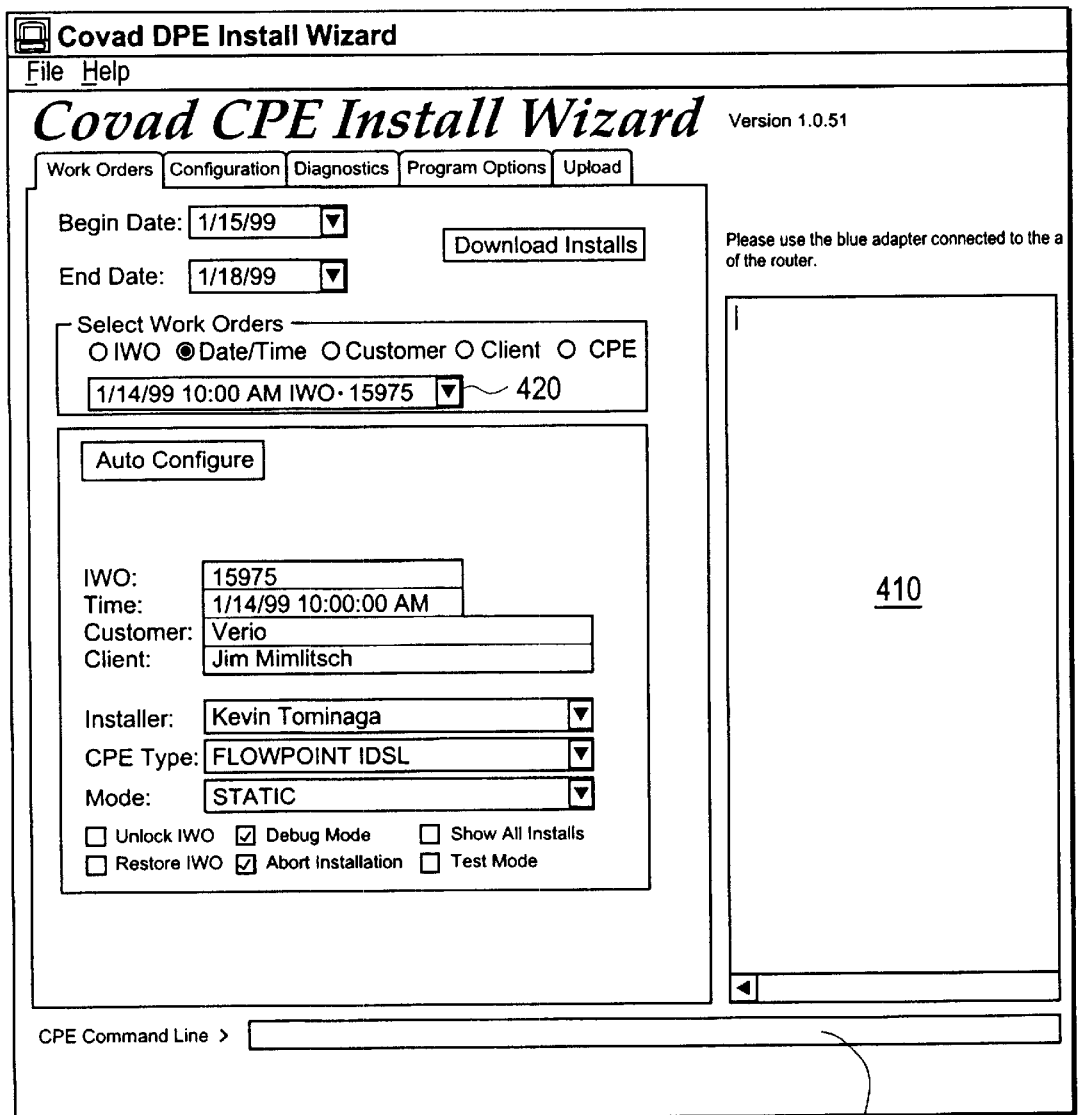
FIG. 4A is a diagram which illustrates an example user interface provided to an installer.
Figure 4B:
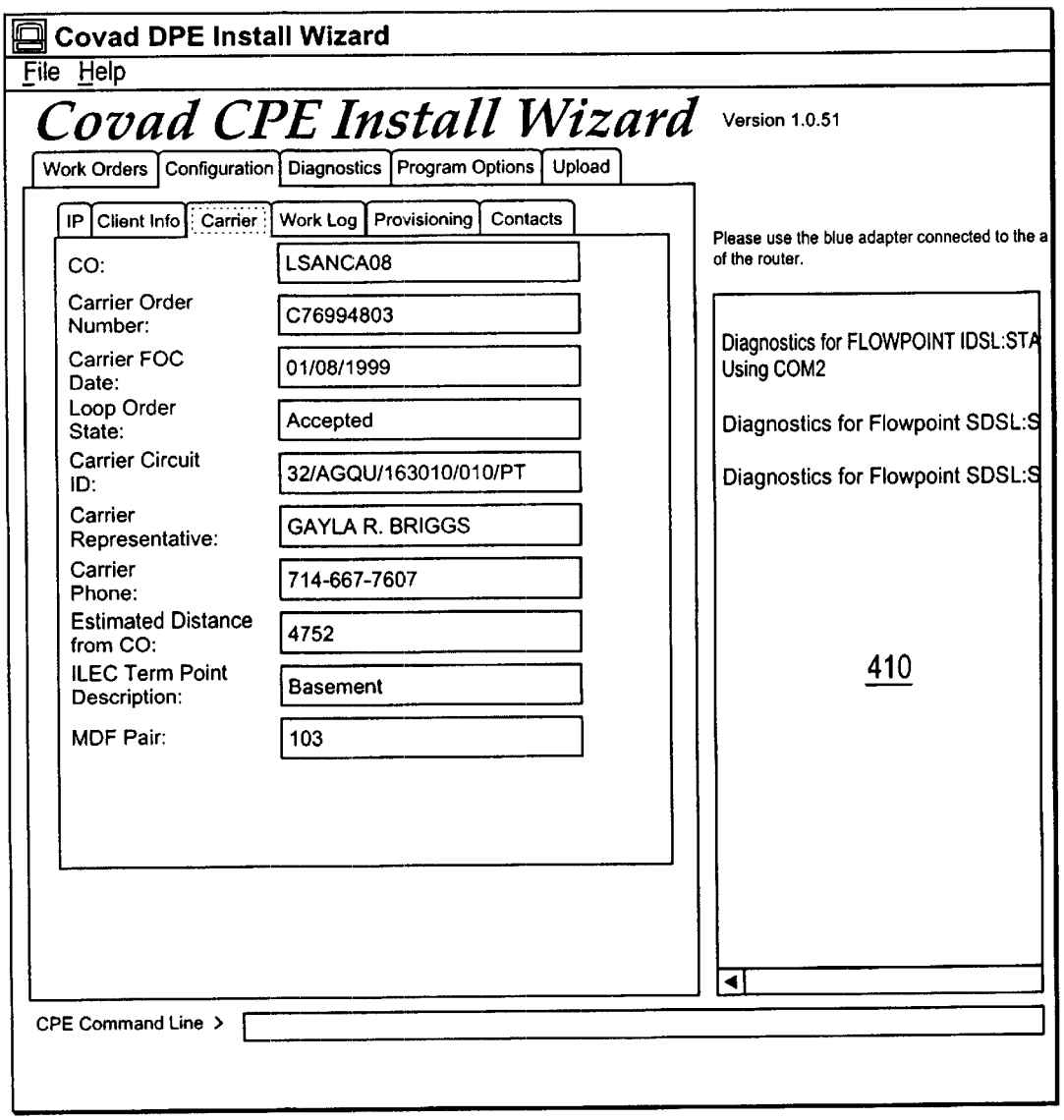
FIG. 4B is a diagram which further illustrates an example user interface provided to an installer.

User interface 330 enables an installer to view and/or modify any configuration parameters (e.g., CPE type or model) stored in database 340. In most instances, installers are only able to view the information. FIGS. 4A and 4B together illustrate a portion of the displayed user interface. As may be readily appreciated, substantial portion of the information is received from central system 160.

With reference to FIG. 4A, there is illustrated how the information may be logically grouped for the convenience of an installer. The selection of 'Work Order' tab causes work order related information to be displayed. The installer may pre-load work order information for a few days by properly selecting the 'Begin Date' and the 'End Date', and then download all the records falling within the two dates by clicking the 'Download Installs' tab.

The installer may then select the appropriate work order by operating selection mechanism 420. The Install Work Order (IWO), time, customer name, user or client name, the name of assigned installer, the CPE type (or model), and mode (whether the CPE is a bridge or a router, the routing/bridging protocol to be used) are displayed for the selected work order. The installer may then click on 'Auto Configure' button to provide an indication to start the configuration process. In response, command generation block 360 may issue the necessary commands on physical interface 182-A. In the alternative, commands may be entered manually in the box entitled, "CPE Command Line" 430. The installer may turn debug mode on or off, and display area 410 is generally used to display any debug or status messages. A designer may further display any instructions directed to an installer in display area 410.

FIG. 4B further illustrates how an installer may view different groups of information. By selecting the 'Carrier' tab, the installer may view Central Office (CO field), carrier order number (the order number to an ILEC to setup the physical connection 125), loop order status (whether the local loop has been provisioned), carrier circuit identifier, carrier representative, carrier phone number, the estimated distance from a central office, ILEC term point description (wiring closet), MDF pair information may be displayed.

Similarly, selection of the IP tab may display the IP addresses, subnet masks, routing information etc. By using the diagnostics tab, an installer may select the diagnostics tab to run diagnostics before completion of an installation. The upload option may be used to send status or log information to central system 160. The status information may indicate the completion of a work order. The log information generally includes the data output by CPE 120-A during configuration such that a more experienced technical person can assist an installer with any encountered problem.

Continuing with exclusive reference to FIG. 3 again, status log 350 may store any output generated by CPE 120-A during configuration. Status log 350 may also maintain information indicating whether the configuration for each assigned work order is complete. When a user requests that the information be uploaded, status log 350 may transfer the data central system 160 using interface 168.

Command generation block 360 is designed to issue configuration commands on physical interface 182-A as specified by a designer. The commands need to be generally designed with the syntax consistent with that expected by subject CPE. Command generation block 360 retrieves command parameters (e.g., IP address, subnet mask) from database 340 and issues commands on physical interface 182-A in the desired syntax.

It may be further noted that command generation block 360 and physical interface 182-A may be designed according to the interface requirements of CPE 120-A. For example, if CPE 120-A is designed to receive some commands in the form of ASCII commands on a serial interface and some other commands in the form of SNMP commands on a local network port, physical interface 182-A may be designed to have both the serial interface and the local network connection to the local network port, and command generation block 360 may be designed to generate the ASCII commands and SNMP commands. In general, physical interface 182-A and command generation block 360 may be designed to generate commands consistent with protocols and/or interfaces such as Common Management Information Protocol (CMIP), Simple Network Management Protocol (SNMP), HyperText Transport Protocol (HTTP), and XML. In an embodiment described in further detail in the present application, only ASCII commands are generated on a serial interface.

In one mode of operation, command generation block 360 issues the commands interactively (but, without the installer having to specify the specific commands or parameters) so that an installer may examine the output (displayed in displayed area 410) for each issued command. In another mode, commands are issued successively unless an error occurs. In both the modes, the output generated by CPE 120 may be displayed in display area 410. Several modes of issuing commands will be apparent to one skilled in the relevant arts based on the disclosure provided herein, and such modes are contemplated to be within the scope and spirit of the present invention.

Thus, when an installer requests automatic generation of configuration commands (for example, by clicking on 'Autoconfigure' box), command generation block 360 may generate the specified configuration commands. As noted above, command generation block 360 may need to use different syntax depending on the model used for the subject CPE. Some considerations in the implementation of command generation block 360 are noted below.

5. Command Generation block

In an embodiment, command generation block 360 may be implemented in software. A state machine is implemented as a state table for each model of the CPE. An example state table 500 for Flow Point Router 3.0 Software available from Flow Point, Inc., is illustrated with reference to FIG. 5. State table 500 may contain five columns, with CPEID 510 storing an integer identifying the model of the router (here 4 represents Flow Point Router 3.0 Software), current stateID representing a state associated with each row, state description 512 is a label for each state represented by a row, and routine ID 515 is a global identifier for the routine. Success state ID 514 and failed state ID 515 columns are described below.

The purpose of each routine in a row is described below. An example implementation of each routine is provided in Appendix A. It should be noted that each routine is identified by routine ID 515, and to the extent the two routines are implemented the same way, the two routines are assigned the same routine ID even though they are referenced by different names. In addition, execution of state tables begins in state 0, and ends when one of the routines transfers control to state 0.

In operation, the execution begins in a state (row) having current stateID 511 equal to 0. Thus, a routine entitled, "Check Flow Point 3.0 Software" and having a routine ID equal to 135 is executed to start with. The routine may issue the appropriate commands to check whether the subject CPE is implemented with the Flow Point 3.0 Software. If the result is a success (confirming that it is the correct software), execution passes to state 24 (as shown in success state 513 column) or else execution passes to state 23 (as shown in success state 514).

Similarly, in state 1, a routine entitled, "Try Default Password" having routine ID of 103 is executed to logon to CPE 120-A using a default password loaded from central system 160. If login is successful, control passes to state 4 or else control passes to state 2. In state 2, a routine entitled, "Try IWO Password" having routine ID of 104 is executed to logon using an Install Work Order password, which is typically supplied by the customer when placing an order to add a user. If the logon is successful, control passes to state 5 or else control passes to state 3.

In state 3, a routine entitled, "Try Special User Password" having routine ID of 106 is executed to logon to CPE 120-A using a special user password supplied by the user. If the logon is successful, control passes to state 6 or else control passes to state 14. In state 4, a routine entitled, "Configure IWO Password" having routine ID of 105 is executed to enable an installer to manually set the Install Work Order (IWO) password in database 340. If the password setting task is successful, control passes to state 5 or else control passes to state 21.

In state 5, a routine entitled, "Begin Configuration" having routine ID of 105 is executed to start the configuration of CPE 120-A. If the configuration is successful, control passes to state 7 or else control passes to state 13. In state 6, a routine entitled, "Configure IWO Password" is executed to enable an installer to set the IWO password manually. If the configuration is successful, control passes to state 5 or else control passes to state 21.

In in state 7, a routine entitled, "Rebooting CPE" having routine ID of 108 is executed to reboot CPE 120-A. Control then passes state 29 irrespective of whether the reboot is successful or not. In state 8, a routine entitled, "After Reboot, Look for Login:" having route ID of 107 is executed to check whether a login prompt is generated by CPE 120-A. If a login prompt is detected, control passes to state 26, or else control passes to state 25.

In state 9, a routine entitled, "Run Diagnostics" having routine ID of 109 is executed to run the diagnostics specified by the designer. If the diagnostics are successful (implying no problem is detected), control passes to state 11, or else control passes to state 12. In state 10, a routine entitled, "Diagnostics Passed" having routine ID of 99 is executed when the diagnostics are successfully performed. If the routine returns a value indicating success, control passes to state 11, or else control passes to state 11.

In state 11, a routine entitled, "Finished" having routine ID of 0 is executed to display some status messages after successful completion of installation, and control passes to state 0. In state 12, a routine entitled, "Repeat Diagnostics" having routine ID of 110 is executed to repeat the diagnostics. If the routine returns a value indicating success, control passes to state 9 or else control passes to state 11.

In state 13, a routine entitled, "Admin Mode, Configuration Failed" having a routine ID of 0 is executed. If the routine returns a value indicating success, control passes to state 0, or else control passes to state 21. In state 14, a routine entitled, "Password Unknown" is executed when a login prompt is not received in state 31 or if special user password does not allow for successful login in state 3. Control then passes to state 0.

In state 14, a routine entitled, "Password Unknown" and having a routine ID of 0 is executed. Control then passes to state 0 irrespective of the result. In state 15, a routine entitled, "Detect FlowPoint Hardware" and having routine ID of 101 is executed. If the routine returns a value indicating success, control passes to state 17 or else control passes to state 18.

In state 16, a routine entitled, "Error: Communication Port" and having routine ID of 0 is executed. Control then passes to routine 0. In state 17, a routine entitled, "Detect FlowPoint Software" having routine ID of 102 is executed. Control then passes to state 19 if the routine returns a value indicating success or else control passes to state 20.

In state 18, a routine entitled, "Error: Detect HW Version" having a routine ID of 0 is executed. Control then passes to state 0. In state 19, a routine entitled, "Logout" having an routine ID of 100 is executed. If the routine returns a value indicating success, control passes to state 1 or else control passes to state 21.

In state 20, a routine entitled, "a routine entitled, "Logout" having an routine ID of 100 is executed. If the routine returns a value indicating success, control passes to state 1 or else control passes to state 21. In state 21, a routine entitled, "Error: Unexpected Response" and having routine ID 0 is executed. Control then passes to state 0. In state 22, a routine entitled, "Error: IWO Password Failed" having a routine ID of 0 is executed. Control then passes to state 0.

In state 23, a routine entitled, "Detect CPE" having routine ID of 99 is executed. If the routine returns a value indicating success, control passes to state 15 or else control passes to state 40. In state 24, a routine entitled, "Try Default Password" having routine ID of 131 is executed to login using default password which is generally loaded from central system 160. If the routine returns a value indicating success, control is transferred to state 32, or else control is transferred to state 27.

In state 25, a routine entitled, "After Reboot, Trying IWO" having routine ID of 104 is executed to trying the initial work order password after reboot is complete. If the routine returns a value indicating success, control is transferred to state 9, or else control is transferred to state 22.

In state 26, a routine entitled, "Try IWO Password" having routine ID of 132 is executed to login to CPE 120-A using the initial work order password. If the routine returns a value indicating success, control is transferred to state 9, or else control is transferred to state 21. In state 27, a routine entitled, "Login Prompt" having routine ID of 130 is executed to determine if the login process is successfully completed. If the routine returns a value indicating success, control is transferred to state 28, or else control is transferred to state 21.

In state 28, a routine entitled, "Try IWO Password" having routine ID of 132 is executed. If the routine returns a value indicating success, control is transferred to state 32, or else control is transferred to state 31. In state 29, a routine entitled, "Login Prompt" having routine ID of 130 is executed. If the routine returns a value indicating success, control is transferred to state 30, or else control is transferred to state 25.

In state 30, a routine entitled, "Try IWO Password" having routine ID of 132 is executed. If the routine returns a value indicating success, control is transferred to state 9, or else control is transferred to state 21. In state 31, a routine entitled, "Login Prompt" having routine ID of 133 is executed. If the routine returns a value indicating success, control is transferred to state 32, or else control is transferred to state 14.

In state 32, a routine entitled, "Detect FlowPoint Hardware" having routine ID of 101 is executed to confirm whether CPE 120-A is from Flow Point, Inc. If the routine returns a value indicating success, control is transferred to state 33, or else control is transferred to state 18. In state 33, a routine entitled, "Detect FlowPoint Software" having routine ID of 102 is executed. If the routine returns a value indicating success, control is transferred to state 4, or else control is transferred to state 4.

In state 40, a routine entitled, "Try Again" having routine ID of 95 is executed to determine whether a valid prompt generated by CPE 120-A. If the routine returns a value indicating success, control is transferred to state 15, or else control is transferred to state 16. As noted above By implementing the routines of state table 500, a Flow Point Router with 3.0 Version of the software can be configured. The implementation of each routine typically requires generating the appropriate commands and examining the output of CPE 120-A received on line 182-A. The routines can be implemented using one of several ways as will be apparent to one skilled in the relevant arts based on the disclosure provided herein. Such other implementations are contemplated to be within the scope and spirit of the present invention. An example method of implementing the routines is illustrated with an example.

5. Configuration using Parameters

Appendix B illustrates the command syntax and the use of parameters provided from central system 160. The commands there are generated using XML. Only a few lines are described here for conciseness. The other lines are similarly described. For purposes of illustration, it will be assumed that CPE 120-A is to be a host name of "homePC" and an Ethernet (i.e., connecting to user system 110-A) IP address of 193.192.191.190 with a subnet mask of 255.255.255.0. As described below, lines 2 and 11–12 respectively accomplish that purpose.

In operation, parameter values may be transmitted from central system 160 corresponding to the three parameter variables, hostname, lanip and lansm. In the present illustration, values of homePC, 193.192.191.190 and 255.255.255.0 are respectively sent for the three parameter variables. The values may be sent in a known way. In an embodiment, the values are encoded in XML format during transmission from central system 160 to portable system 180.

When line 2 of Appendix B is executed, the value homePC is substituted for the portion "<hostname></hostname>", and a command which reads, "system name HOMEPC hostname" is issued to CPE 120-A. Similarly, lines 11 and 12 cause a command of, "eth IP addr 193.192.191.190 255.255.255.0" to be issued after substitution of the corresponding variables.

The remaining lines of Appendix B are similarly described. Thus, the routines may be tailored for each model of CPEs according to the specific interface provided by the CPE. Some general consideration in the operation with different models of CPEs are described below.

6. Implementing Routines for other CPE Models

The commands which may be issued for FlowPoint IDSL router and Cisco 1600 models of CPEs are illustrated with reference to FIGS. 6A and 6B respectively. With reference to FIG. 6A, lines 610 and 628 signal the beginning and end of the sub-routine respectively. Line 611 causes the software to wait (or not issue any command) for 5 seconds. Lines 613 and 615 cause a command 'eth list' (consistent with the syntax of FlowPoint interface) to be issued to CPE 120-A. The parameters command on line 617 sets variable lanip to the value received in response to issuing the 'eth list' command. The expect command of line 619 compares the variable lanip with the configuration parameter (/lanip) received in XML format from central system 160. If there is a match, a value indicating SUCCESS is reported in step 621. If there is no match, failure is reported in line 625.

With reference to FIG. 6B, only the differences from FIG. 6A are noted here for conciseness. The command syntax of line 653 corresponds to that expected for Cisco 1600 router, and is different from that in line 613. The remaining lines are similarly described. It should be noted that, for the same purpose, the two CPEs of FIGS. 6A and 6B, employ a different syntax. That is, the CPE of FIG. 6A uses a syntax of "eth list", while the CPE of FIG. 6B uses a syntax of "sh int eth0". Both the commands use no parameters in this illustration.

Thus, using the example methodology of above, the routines in FIG. 5 can be implemented. The software code used for all the routines of FIG. 5 in one embodiment is included in the Appendix A for illustration. As portable system 160 generates configuration commands without requiring much interaction or skill from an installer, the present invention enables a service provider to use relatively low-skilled people as installers.

It should be understood that embodiments of the present invention can be implemented in hardware, software or a combination thereof. In such embodiment, the various component and steps would be implemented in hardware and/or software to provide the features of the present invention. Any presently available or future developed computer software language and/or hardware components can be employed in such embodiments of the present invention. In particular, the program listing included in the appendix and the flow charts provided above can be especially useful for creating the software embodiments.

7. Conclusion

While various embodiments of the present invention have been described above, it should be understood that they have been presented by way of example only, and not limitation. Thus, the breadth and scope of the -present invention should not be limited by any of the above-described embodiments, but should be defined only in accordance with the following claims and their equivalents.

Appendix A

```
4118  Check Bridging Enabled    <cpecommand>
         <wait>5</wait>
         <say>remote list
         <say>
         <expect>Bridging enabled . . . yes</expect>
         <success>Bridging Enabled OK</success>
         <failure>Bridging Enabled Failed</failure>
         </cpecommand>
4     115  Check DSLAM Connectivity   <cpecommand>
         <wait>5</wait>
         <say>remote stats
         </say>
         <expect>currently connected</expect>
         <success>DSLAM Connectivity Check OK</success>
         <failure>DSLAM Connectivity Check Failed</failure>
         </cpecommand>
4     112  Check LAN IP Address   <cpecommand>
         <wait>5</wait>
         <say>eth list
         </say>
         <parameters>lanip</parameters>
         <expect><lanip></lanip></expect>
         <success>lan ip address confirmed: <lanip></lanip></success>
         <failure>Lan IP Address Mismatch:
         <lanip></lanip></failure>
         </cpecommand>
4     113  Check Lan Subnet Mask   <cpecommand>
         <wait>5</wait>
         <say>eth list
         </say>
         <parameters>lansm</parameters>
         <expect><lansm></lansm></expect>
         <success>lan subnet mask confirmed:
         <lansm></lansm></success>
         <failure>Lan Subnet Mask Mismatch:
         <lansm></lansm><failure>
         </cpecommand>
4     215  Check PPP Connectivity   <cpecommand>
         <wait>5</wait>
         <say>remote stats
         </say>
         <expect>currently connected</expect>
         <success>PPP Connectivity Check OK</success>
         <failure>PPP Connectivity Check Failed</failure>
         </cpecomman
4     119  Check Routing Enabled   <cpecommand>
         <wait>5</wait>
         <say>eth list
         </say>
         <expect>IP Routing enabled . . . yes</expect>
         <success>Routing Enabled OK</success>
         <failure>Routing Enabled Failed</failure>
         </cpecommand>
4     140  Check SDSL Stats    <cpecommand>
         <wait>5</wait>
         <say>sdsl stats
         </say>
         <expect>sdsl</expect>
         <success>SDSL Stats OK</success>
         <failure>SDSL Stats Failed</failure>
         </cpecommand>
4     212  Check Sun Lan IP address  <cpecommand>
         <wait>5</wait>
         <say>eth list
         </say>
         <expect>192.129.100.101<expect>
         <success>Sun lan ip address confirmed:
         192.129.100.101</success>
         <failure>Sun Lan IP Address Mismatch:
         192.129.100.101</failure>
         </cpecommand>
4     213  Check Sun Lan Subnet Mask    <cpecommand>
         <wait>5</wait>
         <say>eth list
         </say>
         <expect>255.255.255.0</expect>
         <success>Sun lan subnet mask confirmed:
         255.255.255.0</success>
         <failure>Sun Lan Subnet Mask Mismatch:
         255.255.255.0</failure>
         </cpecommand>
4     117  Check WAN Incoming Bytes    <cpecommand>
         <wait>5</wait>
         <say>remote stats
         </say>
         <expect>~Total bytes in . . . 0</expect>
         <success>WAN Incoming Bytes OK</success>
         <failure>WAN Incoming Bytes Failed</failure>
         </cpecommand>
4     116  Check WAN Outgoing Bytes    <cpecommand>
         <wait>5</wait>
         <say>remote stats
         </say>
         <expect>~Total bytes out . . . 0</expect>
         <success>WAN Outgoing Bytes OK</success>
         <failure>WAN Outgoing Bytes Failed</failure>
         </cpecommand>
4     131  Default Password - New    <cpecommand>
         <say>admin
         </say>
         <expect>#</expect>
         <success>Login Successful</success>
         <failure>Login Failed</failure>
         </cpecommand>
4     135  Detect 3.0 Software <cpecommand>
         <say>logout
         </say>
         <expect>Login:</expect>
         <success>SW 3.0 detected</success>
         <failure>SW 3.0 not detected</failure>
         </cpecommand>
4      99  Detect Any Valid Prompt    <cpecommand>
         <say>
         </say>
         <response>
         <count>2</count>
         <logic>any</logic>
         <expect-0>></expect-0>
         <expect-1>#</expect-1>
         </response>
         <success>Prompt OK</success>
         <failure>Prompt Not Found</failure>
         </cpecommand>
4     101  Detect Hardware Version    <cpecommand>
         <wait>5</wait>
         <say>version
         </say>
         <response>
         <logic>any</logic>
         <count>1</count>
         <expect-0>SDSL</expect-0>
         </response>
         <success>FlowPoint SDSL HW Detected</success>
         <failure>FlowPoint SDSL HW not Confirmed.</failure>
         </cpecommand>
4     130  Detect Login: - New    <cpecommand>
         <say>logout
         </say>
         <expect>Login:</expect>
         <success>Login: detected</success>
         <failure>Login: failed</failure>
         </cpecommand>
4     102  Detect Software Version   <cpecommand>
         <wait>5</wait>
```

-continued

Appendix A

```
            <say>version
            </say>
            <response>
            <logic>any</logic>
            <count>1</count>
            <expect-0>FlowPoint</expect-0>
            </response>
            <success>FlowPoint SW Detected</success>
            <failure>FlowPoint SW not Confirmed</failure>
            </cpecommand>
4   107 Download Configuration    <pccommand>
            <say>download</say>
            <arg></arg>
            <result>status</result>
            <expect>Download OK</expect>
            <success>Download Completed</success>
            <failure>Download Failed</failure>
            </pccommand>
4   0    Finished     <cpecommand>
            <say>
            </say>
            <response>
            <count>2</count>
            <logic>any</logic>
            <expect-0>></expect-0>
            <expect-1>#</expect- 1>
            </response>
            <success>Install Finished</success>
            <failure>Unexpected Error</failure>
            </cpecommand>
4   103 Login with Default Password    <cpecommand>
            <say>login admin
            </say>
            <expect>#</expect>
            <success>Default Password OK</success>
            <failure>Default Password Failed.</failure>
            </cpecommand>
4   104 Login with IWO Password     <cpecommand>
            <say>login <iwopassword></iwopassword>
            </say>
            <parameters>iwopassword</parameters>
            <expect>#</expect>
            <success>IWO Password OK</success>
            <failure>IWO Password Failed</failure>
            </cpecommand>
4   106 Login with Special Password    <pccommand>
            <say>inputbox</say>
            <result>password</result>
            <arg>Enter Current Password for CPE</arg>
            </pccommand>
            <cpecommand>
            <say>login <password></password>
            </say>
            <parameters>password</parameters>
            <expect>#</expect>
            <succcss>Special Password OK</success>
            <failure>Special Password Failed</failure>
            </cpecommand>
4   133 Login with Special Password-    <pccommand>
            <say>inputbox</say>
            <result>password</result>
            <arg>Enter Current Password for CPE</arg>
            </pccommand>
            <cpecommand>
            <say><password></password>
            </say>
            <parameters>password</parameters>
            <expect>#</expect>
            <success>Special Password OK</success>
            <failure>Special Password Failed</failure>
            </cpecommand>
4   100 Logout     <cpecommand>
            <say>logout
            </say>
            <response>
            <count>2</count>
            <logic>any</logic>
```

-continued

Appendix A

```
            <expect-0>></expect-0>
            <expect-1>:</expect-1>
            </response>
            <success>Logout OK</success>
            <failure>Logout Failed</failure>
            </cpecommand>
4   121 Ping Remote Address    <pccommand>
            <say>inputbox</say>
            <arg>Enter Remote IP Address</arg>
            <result>clientip</result>
            </pccommand>
            <cpecommand>
            <wait>100</wait>
            <parameters>clientip</parameters>
            <say>ping -c 5 <clientip></clienfip>
            </say>
            <expect>packets received 1</expect>
            <success>Ping Remote Address OK</success>
            <failure>Ping Remote Address Failed</failure>
            </cpecommand>
4   120 Ping Remote Gateway    <cpecommand>
            <parameters>gwip</parameters>
            <wait>100</wait>
            <say>ping -c 5 <gwip></gwip>
            </say>
            <expect>packets received 5</expect>
            <success>Ping Remote Gateway OK</success>
            <failure>Ping Remote Gateway Failed</failure>
            </cpecommand>
4   90  Reboot Factory    <cpecommand>
            <wait>400<wait>
            <say>reboot factory
            </say>
            <expect>Syncing filesystems . . . done</expect>
            <success>Reboot Factory OK</success>
            <failure>Reboot Factory Failed</failure>
            </cpecommand>
4   110 Repeat Diagnostics?    <pccommand>
            <say>msgbox</say>
            <result>diagnostics</result>
            <arg>Do you want to repeat diagnostics?</arg>
            <expect>1</expect>
            <success>Repeating Diagnostics</success>
            <failure>Aborting Diagnostics</failure>
            </pccommand>
4   109 Run Diagnostics    <pccommand>
            <say>diagnostics</say>
            <result>status</result>
            <expect>Diagnostics OK</expect>
            <success>Diagnostics Successful</success>
            <failure>Some Diagnostics Failed</failure>
            </pccommand>
4   108 Save and Reboot    <cpecommand>
            <wait>400</wait>
            <say>reboot
            </say>
            <response>
            <count>3</count>
            <logic>any</logic>
            <expect-0>></expect-0>
            <expect-1>#</expect-1>
            <expect-2>:</expect-2>
            </response>
            <success>Reboot OK</success>
            <failure>Reboot Failed</failure>
            </cpecommand>
4   105 Set IWO Password    <cpecommand>
            <say>system admin <iwopassword></iwopassword>
            save
            </say>
            <parameters>iwopassword</parameters>
            <expect>#</expect>
            <success>IWO Password Set</success>
            <failure>IWO Password Set Failed</failure>
            </cpecommand>
4   220 Sun Ping Remote Gateway    <cpecommand>
            <wait>100</wait>
```

-continued

Appendix A

```
    <say>ping -c 5 129.150.31.240
    </say>
    <expect>packets received 5</expect>
    <success>Sun Ping Remote Gateway OK</success>
    <failure>Sun Ping Remote Gateway Failed</failure>
    </cpecommand>
4   132 Try IWO Password - New    <cpecommand>
    <say><iwopassword></iwopassword>
    </say>
    <parameters>iwopassword</parameters>
    <expect>#</expect>
    <success>Login Successful</success>
    <failure>Login Failed</failure>
    </cpecommand>
4   95  Trying Again    <cpecommand>
    <wait>150</wait>
    <say>
    </say>
    <response>
    <count>2</count>
    <logic>any</logic>
    <expect-0>></expect-0>
    <expect-1>#</expect-1>
    </response>
    <success>Prompt OK</success>
    <failure>Prompt Not Found</failure>
    </cpecommand>
```

Appendix B

```
 1  4020 4 .dns system wan2wanforwarding off hostname
 2  system name <hostname></hostname>  hostname
 3  system msg iwo
 4  <hostname></hostname>_<iwo></iwo> lanip
 5  lansm
 6  eth ip enable wanip
 7  eth ip options rxrip off wansm
 8  eth ip options txrip off speed
 9  eth ip options rxdef off
10  eth ip options txdef off
11  eth ip addr <lanip></lanip>
12  <lansm></lansm>
13  remote add internet
14  remote enable internet
15  remote setprotocol rfc1483 internet
16  remote setpvc 0*38 internet
17  remote disbridge internet
18  remote setbroptions stp off internet
19  remote setipoptions txrip off internet
20  remote setipoptions rxrip off internet
21  remote setipoptions private off internet
22  remote setipopfions multicast on internet
23  remote addiproute 0.0.0.0 0.0.0.0 1
24  internet
25  remote setsrcipaddr <wanip></wanip>
26  <wansm></wansm> internet
27  dhcp enable all
28  dhcp set valueoption domainname
29  concentric.net
30  dhcp set valueoption domainnameserver
31  207.155.183.72 206.173.119.72
32  sdsl speed <speed></speed>
33  save
```

What is claimed is:

1. A method of configuring a plurality of models of CPEs, wherein CPEs of each of said plurality of models can be configured by issuing a corresponding plurality of commands, wherein said plurality of commands for different models are specified with a different syntax, wherein at least some of said plurality of commands are specified to contain a parameter, said method comprising the steps of:

(a) implementing a data processing system to be able to issue said corresponding plurality of commands with corresponding specified syntax for each of said models of CPEs;

(b) loading a plurality of parameters from a central system to said data processing system, wherein said plurality of parameters correspond to at least some parameters of said plurality of commands;

(c) providing an interface between said data processing system and a CPE to be configured; and (d) providing an indication to said data processing system to start configuring said CPE to be configured,
    wherein said data processing system issues said plurality of commands corresponding to a model which said CPE to be configured relates to, wherein said plurality of commands are issued according to the syntax specified in step (a), and wherein some of said plurality of commands contain some of said plurality of parameters loaded in step (b),
    whereby the installation of said models of CPEs can be performed by installers easily.

2. The method of claim 1, wherein step (c) comprises providing a serial interface between said data processing system and said CPE such that said plurality of commands can be issued in the form of ASCII text typically entered from a key-board.

3. The method of claim 1, wherein step (a) comprises the further steps of:

(e) providing routines on said central system, wherein said routines can be executed to cause said data processing system to issue said plurality of commands in step (d); and (f) loading said routines onto said data processing system from said central system.

4. The method of claim 2, wherein said routines and said plurality of parameters are encoded in extensible meta-language (XML).

5. The method of claim 4, wherein additional routines are provided on said central system to support a new model of CPE, and wherein said additional routines are loaded onto said data processing system to support said new model of CPE.

6. The method of claim 1, further comprising the step of storing said plurality of parameters in a database provided in said data processing system.

7. The method of claim 1, further comprising the step of uploading the output generated by said CPE to said central system such that a technical expert can assist said installer if any problems are encountered during installation.

8. The method of claim 1, wherein said CPE comprises an internet protocol router, and said parameters comprise an internet protocol address and a internet protocol mask.

9. The method of claim 1, wherein said data processing system comprises a portable system such said installers can easily transport said portable system to several locations with CPEs.

10. A method of providing a configuration service for a plurality of users related to a customer, wherein a plurality of models of CPEs need to be configured to provide said configuration service, wherein a CPE of a corresponding model can be configured by issuing a corresponding plurality of commands, wherein said plurality of commands for different models are specified with potentially a different syntax, wherein at least some of said plurality of commands also contain a parameter, said method comprising the steps of:

(a) implementing a data processing system to be able to issue said corresponding plurality of commands for each of said models of CPEs;

(b) providing a central system for receiving an order from said customer for the configuration of a CPE of one said plurality of models, wherein said CPE relates to one of said users, said customer specifying at least some configuration parameters;

(c) assigning said order to an installer using said central system, wherein said installer loads said configuration parameters from said central system to said data processing system;

(d) said installer providing an interface between said data processing system and said CPE and causing said data processing system to issue said plurality of commands corresponding to said model of said CPE, wherein said commands contain some of said configuration parameters as parameters for said issued plurality of commands, whereby said installer can easily configure said CPE.

11. The method of claim 10, wherein step (d) comprises providing a serial interface between said data processing system and said CPE such that said plurality of commands can be issued in the form of ASCII text typically entered from a key-board.

12. The method of claim 10, wherein said customer indicates said model of said CPE on said central system, and wherein data indicating said model is comprised in said configuration parameters.

13. The method of claim 10, wherein said data processing system comprises a portable system such said installer can easily transport said portable system to several locations.

14. A data processing system for configuring a plurality of models of CPEs, wherein CPEs of each of said plurality of models can be configured by issuing a corresponding plurality of commands, wherein said plurality of commands for different models are specified with a different syntax, wherein at least some of said plurality of commands are specified to contain a parameter, said data processing system comprising:

a receive block for receiving a plurality of parameters from a central system, one of said plurality of parameters indicating a model of a CPE to be configured;

a storage for storing said plurality of parameters; and a command generation block coupled to said storage and said CPE to be configured, said command generation block being designed to issue said corresponding plurality of commands with the specified syntax for all of said plurality of models, wherein said command generation block determines the plurality of commands to be generated according to the model of said CPE to be configured, said command generation block retrieving said plurality of parameters from said storage and issuing said plurality of commands related to said determined model, said plurality of command containing at least some of said retrieved plurality of parameters, whereby said data processing system can be used by relatively low-skilled installers to easily configure several models of CPEs.

15. The data processing system of claim 14, wherein said command generation block is coupled to said CPE by a serial interface such that said plurality of commands can issued in the form of ASCII text typically entered from a key-board.

16. The data processing system of claim 14, wherein said storage comprises a data base system.

17. The data processing system of claim 16, further comprising a parser for receiving said plurality of parameters from said receive block, said plurality of parameters being encoded according to a pre-specified convention, wherein said parser examines the received data and stores said parameters in said data base system.

18. The data processing system of claim 17, further comprising an user interface coupled to said data base system, wherein said parameters stored in said data base system can be displayed by said user interface to an installer of said CPE.

19. The data processing system of claim 14, wherein said command generation block is implemented as a state machine.

20. The data processing system of claim 14, wherein said command generation block is coupled to said CPE by one or more of a serial interface, a SNMP interface, a Telenet interface, a CMIP interface, a HTTP interface, and XML interface.

21. A data processing system for configuring a plurality of models of CPEs, wherein CPEs of each of said plurality of models can be configured by issuing a corresponding plurality of commands, wherein said plurality of commands for different models are specified with a different syntax, wherein at least some of said plurality of commands are specified to contain a parameter, said data processing system comprising:

means for receiving a plurality of parameters from a central system, one of said plurality of parameters indicating a model of a CPE to be configured;

storage means for storing said plurality of parameters; and command generation means coupled to said storage means and said CPE to be configured, said command generation means being designed to issue said corresponding plurality of commands with the specified syntax for all of said plurality of models, wherein said command generation means determines the plurality of commands to be generated according to the model of said CPE to be configured, said command generation means retrieving said plurality of parameters from said storage and issuing said plurality of commands related to said determined model, said plurality of command containing at least some of said retrieved plurality of parameters, whereby said data processing system can be used by relatively low-skilled installers to easily configure several models of CPEs.

* * * * *